Nov. 27, 1956    E. B. LARSON    2,771,967
INTERNAL RESISTANCE BRAKE WITH CLUTCH
Filed March 18, 1954

INVENTOR.
Edwin B. Larson
BY
Atty.

United States Patent Office 2,771,967
Patented Nov. 27, 1956

2,771,967

INTERNAL RESISTANCE BRAKE WITH CLUTCH

Edwin B. Larson, Brush Prairie, Wash.

Application March 18, 1954, Serial No. 417,123

1 Claim. (Cl. 188—91)

My invention relates to motor vehicles and has particular concern with braking apparatus therefor, which may be joined to a driving connection for said vehicle, so that internal resistance may be utilized for braking the motion of said vehicle.

My invention has particular utility in connection with heavily loaded trucks, such for example, as logging trucks which must carry heavy loads up and down substantial grades. At the present time, it is common practice to apply brake blocks and other friction elements to brake drums in order to hold said heavy vehicles when descending grades. The life span of such type of brake is very short because brakes must be applied for prolonged application, and substantial heat is generated over long periods of time. In order to dissipate the heat generated by said braking effect, it is common to cool said brakes by blasts of air, water jacketing and other similar devices. Despite said efforts to dissipate said heat, the brakes frequently disintegrate, if not actually burn up, and they score the drums due to the intense loads which they are called upon to withstand.

I have discovered that a relatively small pumping element may be selectively joined to the propeller shaft or to one of the axles of a vehicle and that the internal resistance interposed by said pumping action will be sufficient to withstand said braking effect without injury to said mechanism. To this end, I provide a fluid pumping mechanism comprising pairs of piston-and-cylinder elements, joined through a restricted passageway. Said pairs of piston-and-cylinder elements are opposed, as by opposite throws of a crankshaft, and thus fluid is pumped alternately into and out of said pairs of piston-and-cylinder elements through said restricted passageway. The restriction to flow provides a braking effect of sufficient applitude to hold back, substantially loaded trucks.

A further feature of my invention is that said piston-and-cylinder elements, and particularly the operating chambers thereof, are provided with projecting air fins which lie in the airstream of the vehicle. Said fins are of sufficient area to dissipate the heat generated in the alternate pulsing of braking fluid back and forth between joined pairs of piston-and-cylinder elements in effecting the braking of a vehicle.

Figure 1:
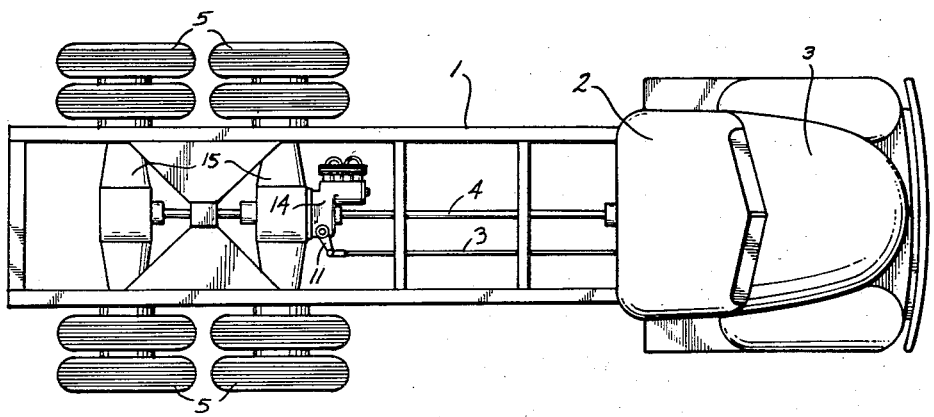
Figure 2:
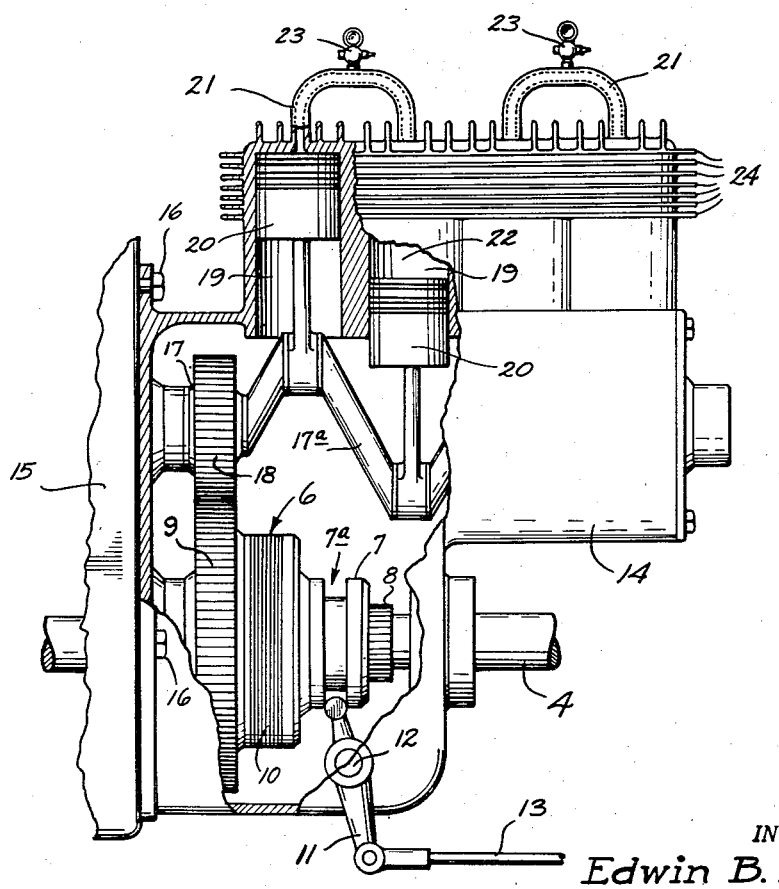

Other and further details of my invention are hereinafter described with reference to the accompanying drawings, in which:

Fig. 1 is a plan view of the chassis of an automobile truck, showing my braking mechanism joined to the propeller shaft thereof and with a controlling rod leading to the cab thereof; and Fig. 2 is an enlarged view of said pumping element, with portions of the frame shown broken away to disclose the details of construction thereof.

My invention is preferably adapted for use in an automobile truck. It does not have such limited use, however, because it is usable as a brake with any type of vehicle or mechanism. In Fig. 1, I illustrate the chassis of a truck having an elongated frame 1, a cab 2 having a conventional hood 3 for housing the motor of a truck. Extending rearwardly from the rear or trailing edge of the cab is a longitudinally disposed driving or propelling shaft 4. It operatively joins axles for the rear or driving wheels 5 of said truck. In said figure, a dual axle truck is illustrated. Many types of heavy trucks are provided with dual axles, and this is particularly true of logging trucks, but said usual construction is not a critical or limiting factor in my invention.

Joined to said shaft 4, as is illustrated in Fig. 2, is a clutch 6 having a slidable collar 7 carried by a splined connection 8 joined to said shaft 4. A driving gear 9 is journaled on said shaft and is joined to said collar by means of multiple disks 10. A shift lever 11, riding in a groove 7a in said collar, moves the latter longitudinally of said shaft 4. When the collar is moved toward the right as viewed in Fig. 2, the clutch is disengaged, and when it is moved toward the left, said clutch is engaged to join the gear 9 operatively to the shaft 4. Said shift lever 11 is rocked about its pivot 12 by a rod 13 leading to the operator's station in the cab 2.

Housing said mechanism and the pumping element, with which my invention is specifically concerned, is a body 14 fixed to an axle housing 15 by bolts or cap screws 16. Said body preferably is elongated and the longitudinal dimension is horizontal so that the pumping cylinders lie laterally to one side of the shaft 4 but substantially in the same horizontal plane thereof, as is illustrated in the drawings. Arranged substantially parallel to the shaft 4 is a crank shaft 17 journaled at its ends in said body. Secured to the left-hand end of said crank shaft is a pinion 18 which meshes with the driving gear 9. Thus, when the clutch 6 is engaged, the rotation of the shaft 4 causes the crankshaft 17 to rotate therewith, being operatively engaged by the meshing of the gear 9 with the pinion 18.

I illustrate the pumping portion of my invention as having four cylinders 19, each with a piston 20 operatively arranged therein. The pistons in successive cylinders are operated by crank throws 17a spaced radially apart 180 degrees. Thus, when the left-hand piston moves upwardly, as is shown in Fig. 2, the next piston to the right will move downwardly and thus their actions are opposed. Successive cylinders, such as the two cylinders at the left, as shown in Fig. 2, are joined in series through a passageway 21 leading externally of the body and being substantially U-shaped in elevation. Said pistons are preferably filled with a fluid, such, for example, as a hydraulic pumping liquid, and thus as one piston, such as in the left-hand cylinder, moves upwardly to expel the contents of said cylinder, the next piston to the right will move downwardly and said fluid will be pumped back and forth the connecting passageway 21.

The cross sectional area of said passageway is extremely limited, and this high internal resistance is set up in moving said fluid back and forth through said passageway. This produces work and constitutes a braking effect upon the rotation of the shaft 4. Successive pairs of piston-and-cylinder elements may be arranged on the crankcase and, as shown in Fig. 2, I illustrate two pairs. There must be at least one pair and the upper limit is dictated only by physical limitations and cost. To admit fluid to the working chambers 22 of the cylinders, I preferably provide petcocks 23 in each of the passageways 21. Thus, fluid may either be added to said passageways and to said working chambers or may be withdrawn therefrom.

Surrounding the external portions of the body 14, which enclose the cylinders and particularly the working chambers 22 thereof, are a plurality of relatively thin fins 24. These completely encircle the body and have substantial exposed areas with respect to their masses. This contruction permits substantial heat to be radiated from the body, and from said cylinders, as the fluid is pumped back and forth between pairs of cylinders. In other words, the pumping of said fluid back and forth through the restricted passageways produces work and this generates substantial heat in the passageway and in said working chambers, and such heat must be dissipated. The fins are continuous and since the pumping element lies flatwise with the fins arranged substantially parallel with the longitudinal dimension of the truck, the airstream continuously flows along said fins and wipes away the elevated temperature thereof and dissipates the heat. By like token but to a greater degree, said passageways 21 lie within U-shaped conduits extending laterally from the heads of the cylinder elements. Thus, air is permitted to flow completely about said passageways and to waste the heat radiated therefrom.

A pumping element embodying my invention may easily and quickly be mounted upon a truck lying between the lateral margins of the frame and secured to the axle housing. A clutch may be secured forwardly of said housing to the driving or propelling shaft and through said clutch, operative connections may be made with the pumping element, such for example, as is illustrated in Fig. 2. Thus, when the clutch is thrown out, said pumping element will exercise no substantial drag upon the progress of the vehicle.

When braking effect is to be developed, said clutch may be engaged and the rotation of the crank shaft will pump the liquid back and forth through the passageways joining adjacent piston-and-cylinder elements. At relatively slow speeds, the braking effect will be less proportionately than at higher speeds because the transverse or cross section of the passageways is fixed. That is to say, if smaller quantities of fluid are passed through said passageways in a given interval of time, the resistance will be much less than if said volumes are forced through said passageways back and forth, in a shorter period of time. Thus, at high speeds, said brake is quite effective to slow down the progress of the vehicle upon which said brake is mounted, while at lower speeds said braking effect is less severe and thus the braking effect is more or less self-limiting, based upon the speed of operation of the vehicle.

As has been pointed out here before, the application of brakes upon logging trucks is a critical problem in the Pacific Northwest, for loads are heavy and the grades sometimes are quite steep. Brakes frequently burn out or are rendered ineffective and said truck, and usually a trailer load frequently gets away from the operator, with disastrous effects. The use of such a braking element upon said truck thus augments the use of the ordinary brakes available to an operator, or they may be used in lieu thereof, particularly in traversing grades of substantial length. If friction brakes are applied to the brake drums for extended periods of time, the heat generated by the braking effect frequently burns the friction blocks, scores the drums, or actually generates sufficient friction and heat to warp the braking members. The problem is so severe that many operators flood the usual brakes with water carried in substantial tanks so that brake applications of standard mechanisms will not produce the damage noted. The utilization of a pumping element such as I have illustrated and described, which utilizes the internal resistance of the brake element, will maintain control of a vehicle upon which it is applied without the resulting hazard or damage. I have found that the arrangement of fins, such as illustrated in the drawings, and the lateral arrangement of the passageways are sufficient in normal operation to maintain the effective temperature of the braking element within proper bounds and without producing heat damage thereto.

I claim:

An internal resistance brake for a vehicle, comprising a hollow casing member bounding and having formed therein at least two laterally extending parallel cylinders which are side by side and are open inwardly to the hollow interior of the casing, a piston member mounted for reciprocation within each of said cylinders, a longitudinal eccentric crank shaft journaled within the hollow interior of said casing and operatively joined to said pistons by crank shaft throws spaced radially 180 degrees such that the movement of the two said pistons are in opposite directions, rotatable spur gear and disc clutch means operatively joined in series to said crank shaft within said casing hollow interior selectively to engage and to disengage the crank shaft with rotatable drive means originating with an exterior source, a closed hydraulic conduit interconnecting said cylinders through ports formed one in the outer end of each cylinder casing, said hydraulic conduit being U shaped in elevation and extending laterally out from said casing, a pet cock opening into said hydraulic conduit intermediate said ports by means of a short branch conduit so as to leave unrestricted the internal bore of the conduit, hydraulic fluid completely filling said conduit and the space between each piston and the outer portion of the corresponding cylinder, said conduit being of a preselected restricted and constant cross sectional area to generate a preselected resistance to flow of the hydraulic fluid back and forth therethrough, and plural air cooling fins both encircling said casing about said cylinders and projecting laterally out from the outer end of each cylinder casing.

References Cited in the file of this patent

UNITED STATES PATENTS

| | | |
|---|---|---|
| 1,485,304 | Shoemaker | Feb. 26, 1924 |
| 1,485,802 | Morlan | Mar. 4, 1924 |
| 1,512,810 | Sloper | Oct. 21, 1924 |
| 1,577,983 | Rairdan | Mar. 23, 1926 |
| 1,630,711 | McCleary | May 31, 1927 |
| 1,946,594 | Skillman | Feb. 13, 1934 |
| 1,980,550 | Roblee | Nov. 13, 1934 |